United States Patent [19]

Sonetaka et al.

[11] 4,211,672

[45] Jul. 8, 1980

[54] SUPPORTED CATALYST FOR PURIFYING GAS AND METHOD OF MANUFACTURING THE SAME

[75] Inventors: Kazunori Sonetaka, Hirakata; Atsushi Nishino, Neyagawa; Kunio Kimura, Hirakata, all of Japan

[73] Assignee: Matsushita Electric Industrial Co., Ltd., Osaka, Japan

[21] Appl. No.: 936,507

[22] Filed: Aug. 24, 1978

[30] Foreign Application Priority Data

Aug. 26, 1977 [JP] Japan .................................. 52-102971

[51] Int. Cl.$^2$ ...................... B01J 21/12; B01J 21/58; B01J 23/78
[52] U.S. Cl. ............................. 252/455 R; 252/455 Z; 252/466 B
[58] Field of Search .......... 252/455 R, 466 J, 466 PT, 252/455 Z, 466 B; 423/239, 213.5

[56] References Cited

U.S. PATENT DOCUMENTS

| | | | |
|---|---|---|---|
| 2,825,700 | 3/1958 | Ashley et al. | 252/455 R |
| 3,256,207 | 6/1966 | Arnold | 252/455 R |
| 3,359,215 | 12/1967 | Reitmeier | 252/459 |
| 3,392,001 | 7/1968 | Lorenz et al. | 252/466 J |
| 3,507,811 | 4/1970 | Davies et al. | 252/455 R |
| 3,947,381 | 3/1976 | Campbell et al. | 252/466 J |

*Primary Examiner*—W. J. Shine
*Attorney, Agent, or Firm*—Wenderoth, Lind & Ponack

[57] ABSTRACT

The present invention discloses an improved supported catalyst for gas purification which comprises a catalyst carrier composed of a molded body including alumina cement having a CaO component in an amount of less than 40% by weight, an $Al_2O_3$ component in an amount of more than 35% by weight and an iron oxide component in an amount of less than 20% by weight. Additionally, catalytic materials and auxiliary materials may be added, depending on necessity. A platinum group metal is then supported on the catalyst carrier. There is also disclosed a method for manufacturing such catalyst.

5 Claims, 9 Drawing Figures

SUPPORTED CATALYST FOR PURIFYING GAS AND METHOD OF MANUFACTURING THE SAME

BACKGROUND OF THE INVENTION

The present invention relates to gas purification for atmospheric pollution prevention and more particularly, to a gas purification catalyst especially intended for purification of exhaust gases including lamp black or soot, odor, noxious compounds, and the like, and generated, for example, from various kinds of household or home use burning and cooking appliances utilizing petroleum, gas, briquet, etc., and manufacturing method for such a catalyst.

Compositions of the exhaust gases developed from the home use appliances, etc., as described above are not the same, but differ according to the appliances employed, and these compositions are, for example, carbon monoxide due to incomplete combustion, hydrocarbons, especially olefin group hydrocarbons in the case of burning appliances, and mainly aliphatic or fatty acid group hydrocarbons and kinds of aldehydes in the case of cooking appliances.

Recently, owing to increased air tightness in buildings following the spread of aluminum sash window frames and tendency to multistory construction of apartment houses, mansions, etc., ventilation of indoor air has become very difficult. Under such circumstances, it is strongly desired to increase safety of the household burning appliances and also to eliminate smoke and odor from exhaust gases generated, for example, during cooking. Meanwhile, in the home use burning appliances, technical innovation is under way for higher performance and lower price, and thus development of catalysts of low cost is essential to cope with such technical progress and state of the market in this line of trade.

Conventionally, various kinds of catalysts have been proposed and put into production for meeting the requirements as described in the foregoing, the outstanding catalysts being precious metal catalysts and metallic oxide catalysts. Among known metal catalysts, platinum, palladium or platinum black have been regarded as particularly suitable. However, platinum catalysts conventionally proposed are generally high in cost, and although the metallic oxide catalysts are cheaper than such platinum catalysts, they are still expensive to be used for the household burning appliances. The high cost of the platinum catalysts is attributable not only to expensiveness of the platinum itself, but to the fact that the alumina molded item to be employed as a carrier is expensive and that the manufacturing process in which platinum is caused to be supported on the carrier is rather complicated. The carrier for the catalysts is not limited to alumina, but heat-resistant, chemically inactive and porous substances such as zircon, schreit-sillimanite, magnesium silicate, aluminosilicate, etc. may be employed as disclosed, for example, in Japanese patent publication Tokkosho 47-50980 although those having alumina as main component are mainly employed for practical use. Meanwhile, catalysts employing porous metal as carrier have also been put into production recently.

The substances to be employed as carrier may be broadly divided into ceramic materials and metallic materials, and various methods have conventionally been proposed for manufacturing such carriers. However, the catalysts produced by employing such carriers have advantages and disadvantages of their own, and are expensive, thus requiring further improvement for application thereof to the home use burning appliances, etc.

SUMMARY OF THE INVENTION

Accordingly, an essential object of the present invention is to provide an improved catalyst for gas purification which enables burning appliances and the like to be used safely and comfortably even during abnormal conditions of use as well as normal conditions of use of such burning appliances, with simultaneous purification of smoke and odor of exhaust gases through oxidation during use of cooking appliances and the like.

Another important object of the present invention is to provide an improved catalyst of the above described type which is stable in functioning with high performance and superior catalytic activity and yet, is available inexpensively.

A further object of the present invention is to provide a method of manufacturing an improved catalyst of the above described type through simple processes on a large scale and at low cost.

In accomplishing these and other objects, according to one preferred embodiment of the present invention, the supported catalyst for gas purification comprises a catalyst carrier composed of a mold body including: alumina cement having lime component of less than 40% by weight, alumina component of more than 35% by weight and iron oxide component of less than 20% by weight, additives such as catalytic materials and auxiliary materials depending on necessity, and a catalyst be supported on the catalyst carrier. The catalyst carrier includes alumina cement of more than 15% by weight, and the aggregate of less than 85% by weight. By the structure as described above, improved catalysts with superior gas purification performance are advantageously presented through a simple process at low cost.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like symbols represent like items throughout several graphs of the accompanying drawings.

DETAILED DESCRIPTION OF THE INVENTION

The present invention seeks to provide an improved supported catalyst low in cost and superior in catalytic activity through elimination of disadvantages inherent in the conventional catalysts. The supported catalyst of the present invention, as described in the foregoing, comprises a molded body which contains alumina cement having lime aluminate as main component which molded body is employed as carrier on which the catalyst is to be supported. For causing the catalyst to be supported on the carrier, a metallic salt of the catalyst is caused to adhere to the surface of the carrier through a suitable method of application and then the metallic salt is converted into a catalytic substance through drying, heat treatment or reduction treatment.

More specifically, main components of the alumina cement employed herein are (1) a lime component in an amount of less than 40 weight %, (2) an alumina component in an amount of more than 35 weight %, and (3) an iron oxide component in an amount of less than 20 weight %.

In the carrier composed of the alumina cement, various additives may be included depending on necessity. Although metals of platinum group are mainly used for the catalyst, other metals and metallic oxides may also be used.

It should be noted here that the catalyst according to the present invention is low in cost and superior in catalytic activity, heat resistance, abrasion resistance, etc.

In the first place, the main component of the catalyst carrier employed in the present invention is the alumina cement which is differentiated from Portland cement, and the alumina cement is generally represented by $mAl_2O_3 \cdot nCaO$, while Portland cement is denoted by $m'SiO_2 \cdot n'CaO$.

Although large in demand and consequently low in cost, Portland cement has disadvantages in that it is rather inferior in the heat resistance and slow in the speed of hardening. On the other hand, the alumina cement is high in the heat resistance and hardening speed, and therefore, preferable from the viewpoint of catalyst manufacturing. The alumina cement has the composition as described earlier, and although mechanical strength of the carrier is increased when the CaO component thereof exceeds 40% by weight, its heat resistance conversely decreases, with simultaneous reaction thereof with heavy metallic oxides at high temperatures so that manganese oxides form $CaMn_2O_4$, etc. for example, at temperatures higher than approximately 650° C., thus giving rise to thermal destruction of the catalyst. Meanwhile, the heat resistance thereof is increased, if the CaO component is small, but its mechanical strength is conversely decreased, with prolonged curing time during molding, thus resulting in reduction of productivity. Additionally, the heat resistance is decreased when the $Al_2O_3$ component is reduced to lower than 35% by weight, while said heat resistance is improved, as the $Al_2O_3$ component is increased. Moreover, when the iron oxide component exceeds 20% by weight, the mechanical strength during heating is reduced, with simultaneous reduction of the heat resistance. The iron oxide as described above has a catalytic function for gas purification, for example, for purification of carbon monoxide at temperatures higher than approximately 300° C. For causing such promoting effect to be displayed, it is preferable that the iron oxide be contained at more than 2% by weight.

The preferable compositions of the alumina cement are CaO component of 15 to 40 weight % and particularly of 30 to 40 weight %, $Al_2O_3$ component of 35 to 80 weight % and particularly of 40 to 60 weight %, and iron oxide component of 0.3 to 20 weight % and particularly of 2 to 10 weight %.

Moreover, Portland cement described earlier can not withstand temperatures higher than 300° C., and thus, is not suitable for the gas purification purpose of the household burning appliances in which temperatures of the catalyst are likely to exceed approximately 300° C. Although the alumina cement can sufficiently withstand temperatures higher than 300° C., it is preferable to employ high alumina cement for withstanding temperatures higher than approximately 700° C.

It should be noted here that since the alumina cement functions as binding agent in the catalyst carrier employing such alumina cement, the amount of the alumina cement should be at least 15% by weight. If the amount of the alumina cement as described above is small, the molded item is undesirably low in mechanical strength, with small surface harness (abrasion resistance strength) and decreased surface area as carrier.

The present inventors have made various investigations into the mixing proportions as described above, and found desirable mixing proportions according to configurations of the molded items as tabulated in the Table below.

| Configurations of molded items | Alumina cement | Aggregate |
| --- | --- | --- |
| Pellet type | 40–95% | 5–60% |
| Honeycomb type | 15–60% | 40–85% |

In the above table, the "pellet type" for the molded item configuration refers to those formed into rod, spherical, or square shapes, which are small in volume as the catalyst carrier, and therefore, they are not much affected in their spalling resistance such as resistance against thermal destruction (cracking), etc. without any possibility for cracking at high temperatures, even when the aggregate employed is small in quantity. Meanwhile, the "honeycomb type" refers to those formed into column or plate-like shapes with many circular, elliptical and square openings or holes provided therein, and since large in volume as catalyst carrier, they exhibit large effects in spalling resistance such as resistance against thermal destruction, etc., thus it is necessary to reduce their expansion and contraction at high temperatures by increasing the amount of the aggregate to be included therein.

As the aggregates, silica group aggregate, silica alumina group aggregate, and alumina group aggregate may initially be mentioned and it is preferable to employ aggregates in mineral phase such as silicate minerals, mullite, corundum, sillimanite, $\beta$-alumina and those of magnesia, chrome, dolomite, magnesite-chrome and chrome magnesite group. Furthermore, it is also possible to use general aggregates at the low temperature side (250°–700° C. or preferably 300°–700° C.) and heat resistant aggregate at the high temperature side (higher than 700° C.) depending on working temperatures of the catalysts.

More specifically, in the silica group aggregates, there are silica stone and the like, and these aggregates have $SiO_2$ as main component. In the silica alumina group aggregates, there are included chamotte, agalmatolite, high alumina, etc. which have $SiO_2$-$Al_2O_3$ as main component, while as the alumina group aggregates, $\alpha$-$Al_2O_3$, $\beta$-$Al_2O_3$, $\gamma$-$Al_2O_3$, $\delta$-$Al_2O_3$, etc. are available. It should be noted here that alumina may be replaced by aluminum hydroxide employed as starting material for conversion into alumina through heat treatment. Moreover, silicate minerals, mullite, corundum, sillimanite, $\beta$-alumina may be employed as a general main mineral phase. Meanwhile, materials prepared by roughly grinding the above described aggregate or commercially available aggregates of conichalcite silica sand, alumina, chamotte, etc. may be used, and for general purposes, it is convenient to employ silica sand or chamotte available in the market. Additionally, aggregates of magnesia, chrome, dolomite, magnesia-chrome and chrome magnesite group may be used, but since they are normally used for extremely high temperatures, such aggregates are not suitable for obtaining inexpensive catalyst carriers. In general, the aggregates have only to be superior in the spalling resistant characteristics with respect to temperatures of approximately 1000° C. at the maximum, and thus, silica group aggregates sufficiently meet the requirements, while for temperatures of approximately 600° C. at the maximum, inexpensive aggregates of the silica group aggregates such as plain sand, seashore sand, etc. may be conveniently employed. Furthermore, in the materials usable for the aggregates, there are fibrous organic substances which are particularly effective for reducing deterioration of mechanical strength at high temperatures, and for which asbestos, glass fibers, etc. may be employed. For the above purpose, ordinary asbestos having magnesia silicate as main component is sufficient, while it is necessary to employ materials superior in fire resistance for use at particularly high temperatures. On the other hand, for the glass fibers, it is preferable to employ alkali-resistant glass fibers so as to withstand alkali component in the alumina cement. In the above case, however, it is necessary to determine the length, thickness, or configurations of the glass fibers, i.e, whether they are in the state of a mat or chopped strands.

Subsequently, particle size of the aggregate will be described hereinbelow.

Although particles of fine size may be used without any inconvenience for aggregates having small volume such as the pellet type, it is necessary to employ particles of large size for those with large volume such as the honeycomb type. Especially, in the honeycomb type of large volume wherein the spalling resistance is particularly important, it is possible to reduce expansion and contraction of the catalyst carrier and simultaneously to increase the mechanical strength of such catalyst carrier by employing particles of large size. Above all, mixing of particles of large size and small size is preferable. Another important role of the aggregate is to increase the specific surface area of the catalyst carrier, which is an essential item for the catalyst carrier. Therefore, it is preferable to employ an aggregate particularly having a large specific surface area, for example, $\gamma$-$Al_2O_3$, etc.

Subsequently, selection of additives will be described hereinbelow.

There may be employed generally inexpensive and low pollution metallic oxide catalysts of manganese, copper, iron oxides, etc. having catalytic functions themselves.

| Configurations | Catalyst material | Alumina cement + aggregate |
|---|---|---|
| Pellet shaped carrier | 0–50 wt % | 20–100 wt % |
| Honeycomb shaped carrier | 0–30 wt % | 20–100 wt % |

Finally, as auxiliary agents, those increasing the specific surface area and those having auxiliary effects on the performance, abrasion resistance, longevity, etc. may be employed. For increasing the specific surface area of the catalyst carrier, there is one method in which the specific surface area is increased by the aggregate and another method in which the surface of the catalyst carrier is made porous through inclusion of thermally decomposable salt during manufacturing of the catalyst carrier, and for the latter thermally decomposable salt, organic salts are particularly suitable. It is also possible to make the carrier surface porous by causing alcohol, carboxymethylcellulose, polyethylene to be included in the carrier, with subsequent heat treatment. Moreover, as auxiliary agents, zeolite, double oxides (ferrite), silica sol, etc. may also be included. One example of a preferred composition is shown in the table below.

| Configurations | Auxiliary agent | Catalyst material | Alumina cement + aggregate |
|---|---|---|---|
| Pellet shaped carrier | 0–20 wt % | 0–50 wt % | 20–100 wt % |
| Honeycomb shaped carrier | 0–20 wt % | 0–30 wt % | 20–100 wt % |

In the next step, the method of manufacturing the catalyst carrier will be explained hereinbelow.

Alumina cement is mixed with aggregate, with further addition of catalytic materials and auxiliary material depending on the necessity, and after dry process mixing thereof, the carrier is molded, with addition of water or colloidal salt necessary for the molding. In the above case, the water or colloidal salt should be added in such an amount as to suit to the configuration and size of the item to be molded, since the molding becomes difficult, if the amount is excessive or too small, and after molding, the molded carrier is subjected to perfect curing in water, when it has hardened to a certain extent to have such a strength that it will not collapse in the case of the perfect curing in water, and subsequent to drying or heat treatment, the resultant catalyst carrier is obtained.

Conventionally, most of the catalyst carrier materials are subjected to a sintering process during molding, with active alumina and the like having large surface area being applied on the surface of such carrier materials for supplementing its small surface area, but it is to be noted that the present invention is characterized in that the carrier has the sufficient strength and ample surface area without sintering as described above.

Subsequently, the method of supporting the catalyst is broadly divided into three kinds, i.e., co-precipitation method, impregnation method, and application method. Although the methods as described above respectively have their merits and demerits, the impregnation method is employed for the platinum catalyst of the honeycomb shape having alumina as the carrier. The impregnation method as described above is comparatively simple, but has such disadvantages that there are cases where the amount of supported catalyst is restricted or wherein the surface of the carrier is subjected to abrasion, and reduction in the area or in the number of pores.

In the EXAMPLES according to the present invention described later, the impregnation and application methods are mainly employed.

The catalysts to be supported are mainly of platinum group metals including, for example, platinum, palladium, ruthenium, rhodium, iridium, osmium, etc., and for the salts thereof, chlorides are preferable, representative ones of which are tetrachloroplatinate $H_2PtCl_4 nH_2O$, hexachloro platinate $H_2PtCl_6 nH_2O$, platindiaminodinitrate $Pt(NH_3)_2(NO_2)_2 nH_2O$, palladium chloride $PdCl_2$, ruthenium chloride $RuCl_3$, rhodium chloride, etc. For actual use, these metallic salts as described above are dissolved into solvents such as water or alcohol. Although the concentration thereof may differ depending on the amount to be applied and the methods of supporting, optimum concentration must be determined according to the purpose for use, configuration of the carrier, etc., since dispersion of the catalyst particles is deteriorated, if concentration of the solvent is excessively high. Particularly, when the platinum metal is employed, a catalytic material superior both in initial performance and longevity and having the supported amount of platinum in the region of 0.001 to 0.1% by weight as compared with conventional platinum catalyst, may be obtained. More specifically, in the known platinum catalysts, carriers of alumina, cordierite, etc. are employed, with the supported amount of platinum being in the range from 0.1 to 0.5% by weight, which are commonly accepted, since deterioration of longevity is particularly large when the supported amount is less than 0.1% by weight. On the contrary, when the catalyst carrier according to the present invention is employed, high performance is expected even when the supported amount of platinum is slight. It is to be noted that there is a close relation between the amount of catalyst supported and performance, and the performance is improved as the supported amount increases, but that if the supported amount is too large, problems such as falling off of the catalyst may result. Furthermore, it is possible to improve ranges of applications, configurations, activity at low temperatures, life, etc. of the catalyst by causing the carrier to support more than two kinds of various metals and metallic oxides besides the adjustment of the supported catalyst amount.

The heating of the carrier impregnated with the foregoing metallic salt solution at temperatures below 700° C. converts the metallic salt into a catalytic metal and catalytic metal oxide.

Figure 1:
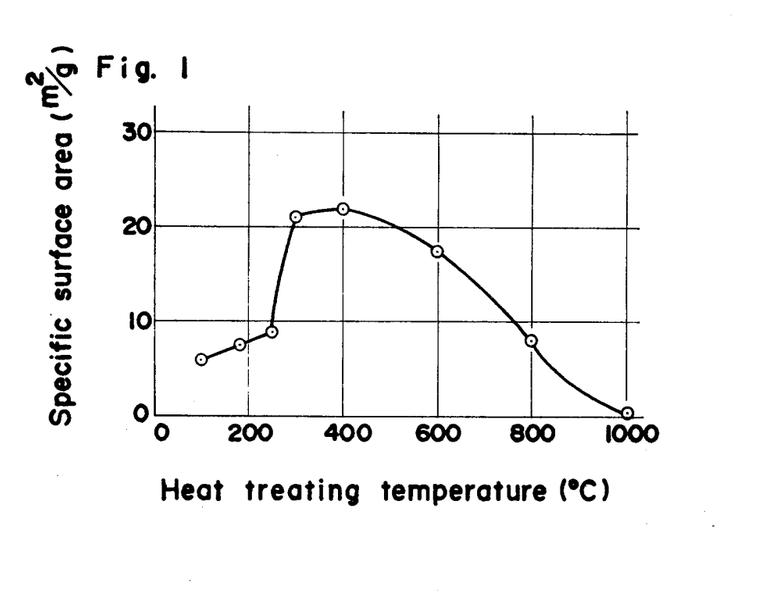
FIG. 1 is a graph showing the results of measurements of specific surface areas by BET method when catalyst carriers made of alumina cement are heat-treated at various temperatures.

Referring now to the drawings, there are shown in a graph of FIG. 1 results of measurements of specific surface area by the BET method in the case where the pellet molded member composed of alumina cement and having diameter of 5 mm and length of approximately 3 mm is subjected to heat treatments for one hour at various temperatures.

As is clear from the graph of FIG. 1, the specific surface area of the carrier is rapidly increased in the vicinity of 250° C. due to dehydration of the bonding water in the alumina cement of the catalyst carrier. The specific surface area of the α-alumina carrier commercially available at present is in the range from 5 to 15 $m^2/g$ as measured and is smaller than that of the conventional γ-alumina carrier in the range from 100 to 300 $m^2/g$, but from the fact that the catalyst superior in low temperature activity is available even with the platinum catalyst which employs α-alumina, it is seen that the catalyst carrier using the alumina cement sufficiently exhibits its expected functions.

Referring to the graph of FIG. 2, there are shown purification rates for carbon monoxide with respect to samples prepared by forming, into the pellets as stated earlier, alumina cement of various compositions of 50 weight % and silica sand (No. 7) of 50 weight % as shown in Table 1 below, with subsequent heat treatment of the pellets for one hour at a temperature of 350° C. In the above case, the catalyst temperatures were at 400° C. and 600° C., while the measuring conditions of the purification rates are the same as in EXAMPLE 1 mentioned later.

Figure 2:
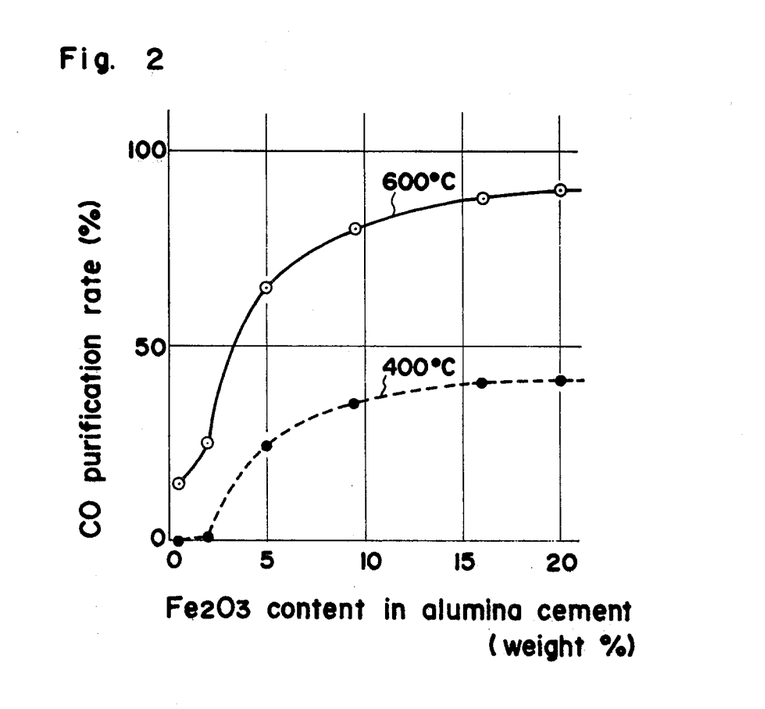
FIG. 2 is a graph showing the relation between CO purification rates and iron oxide content in alumina cement for catalyst carrier composed of alumina cement and silica sand.

As is seen from the graph of FIG. 2, as the amount of iron oxide component in the catalyst carrier (i.e., in the alumina cement) is increased, the purification capacity for carbon monoxide is also increased.

Table 1

| | Compositions (weight %) | | | | |
| --- | --- | --- | --- | --- | --- |
| | $Al_2O_3$ | CaO | $SiO_2$ | $Fe_2O_3$ | $TiO_2$ |
| i | 72.5 | 26.5 | 0.3 | 0.5 | — |
| ii | 53.5 | 28.0 | 4.3 | 2.0 | 2.0 |
| iii | 50.5 | 36.5 | 4.4 | 5.0 | 2.5 |
| iv | 47.1 | 36.0 | 4.8 | 9.5 | 2.4 |
| v | 40.0 | 38.0 | 4.0 | 16.0 | — |
| vi | 36.0 | 38.5 | 5.0 | 20.0 | — |

Figure 3:
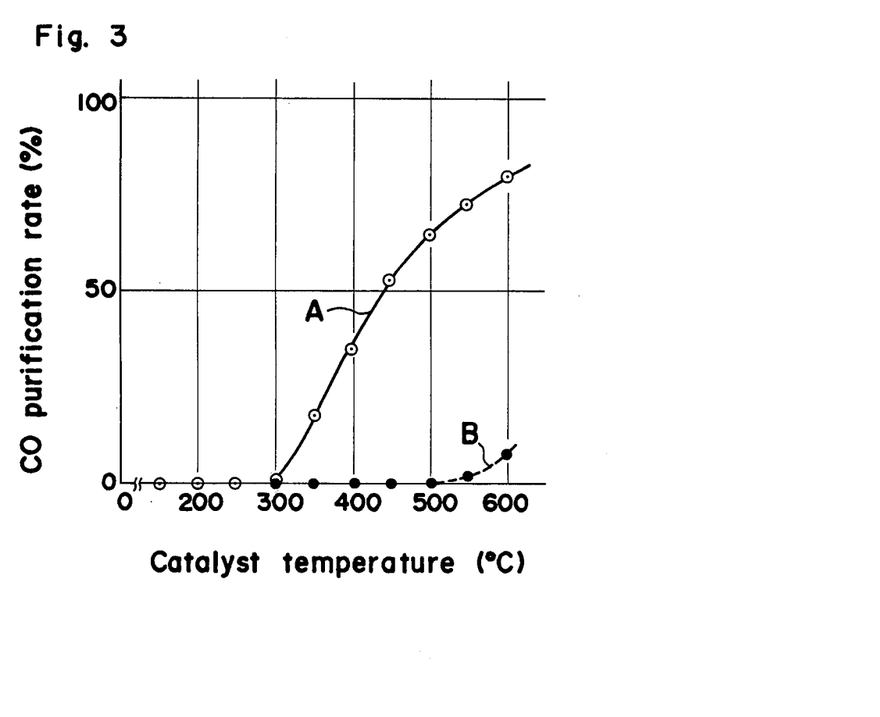
FIG. 3 is a graph showing a comparison of the CO purification rate of the catalyst carrier of the present invention and that of the conventional catalyst carrier.

In a graph of FIG. 3, there is shown a comparison of the purification rates for carbon monoxide between pellets A composed of the alumina cement of 50 weight % and silica sand (No. 7) of 50 weight % having compositions shown in the item iv of the above Table 1, and pellets B composed of the commercially available α-alumina, with the pellets A and B being subjected to heat treatments for one hour at a temperature of 300° C. after the molding.

As is noticed from the graph of FIG. 3, the catalyst carrier according to the present invention has a considerably favorable catalytic function at high temperatures, while the commercially available catalyst carrier has almost no purification capacity even at high temperatures.

Figure 4:
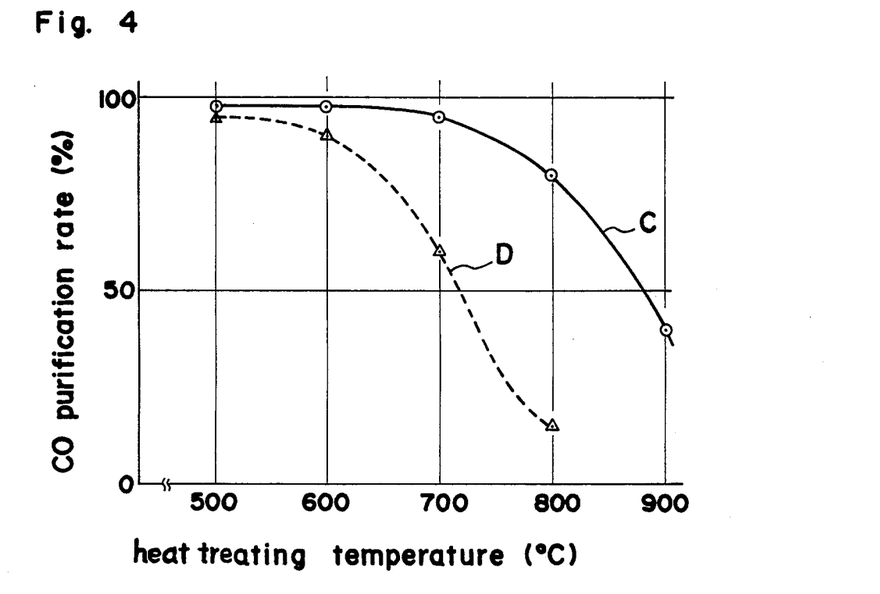
FIG. 4 is a graph showing a comparison of the CO purification rate of the catalyst carrier of the present invention and that of the conventional catalyst carrier, each subjected to different temperatures for heat treatments.

The graph of FIG. 4 compares the purification capacity at 200° C. for carbon monoxide between the pellets C composed of the alumina cement of 100 weight % having the composition shown in the item iv of the above Table 1 and pellets D composed of the commercially available γ-alumina, with the pellets C and D being subjected to heat treatments for one hour at a temperature of 300° C. after molding, and with the platinum supporting amount being 0.05 weight % with further heat treatment for one hour at temperatures from 500° to 800° C.

From the graph of FIG. 4, it is noticed that in the catalyst carrier of the present invention, the performance thereof is reduced at heat treating temperatures higher than 700° C., while the low temperature activity of the catalyst carrier composed of γ-alumina is rapidly reduced at temperatures higher than 600° C., possibly due to extreme reduction of the specific surface area. Meanwhile, the catalyst carrier of the present invention is small in the variation of the specific surface area as compared with that of γ-alumina, and has a large surface area even at high temperatures, with consequent small thermal deterioration.

Figure 5:
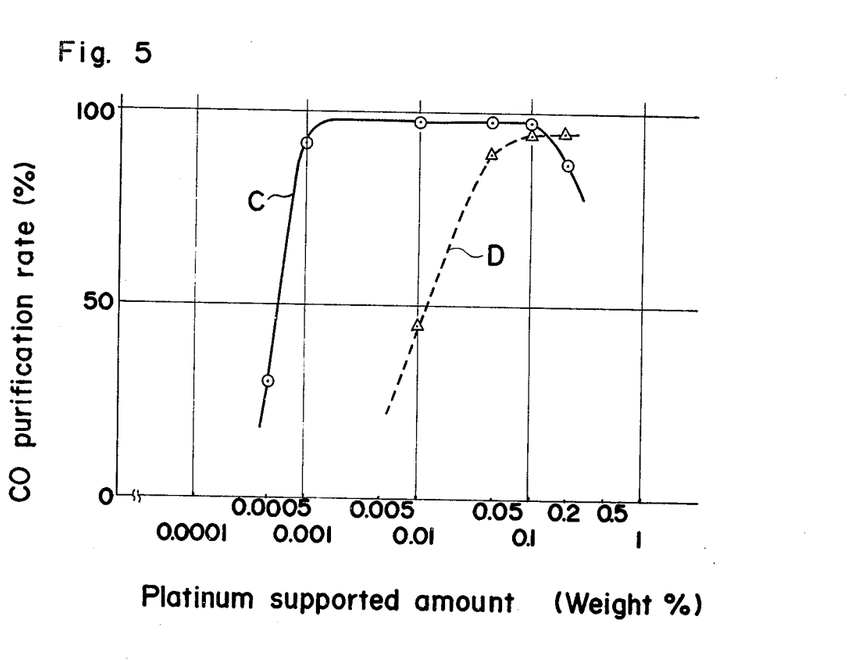
FIG. 5 is a graph showing a comparison of platinum supported amounts on catalyst carriers and CO purification rates between the catalyst carrier of the present invention and a conventional catalyst carrier.

Referring also to a graph of FIG. 5, there is shown a comparison of the purification capacity at 200° C. for carbon monoxide between pellets C for the catalyst carrier of the present invention and pellets D of γ-alumina, with platinum being supported thereon through the application method being 0.0005, 0.0001, 0.01, 0.05, 0.1 and 0.2% by weight, and with the pellets C and D being subjected to heat treatments in an electric furnace for one hour at a temperature of 600° C. As is seen from the graph, the catalyst carrier of the present invention is free from deterioration in performance in the range of supported platinum amounts of from 0.001 weight % to 0.1 weight %, and the performance tends to be rather deteriorated when the supported amount reaches 0.2 weight %, while the catalyst carrier of the pellets D shows improved performance at the supported amount exceeding 0.05 weight %. The tendency as described above shows that there is a close relation between the property (surface area) of the catalyst carrier, amount of the supported catalyst and performance, and that the surface area (porosity in the surface) is particularly important. The latter may partly be attributable to the fact that since the uniform dispersing conditions of platinum differ depending on catalyst carriers, it is rather preferable to cause platinum to be uniformly distributed in an amount smaller than in the conventional practice when the alumina cement is employed, and that if the supported amount is further increased, platinum particles are formed into a lump to be locally present at the porous portion on the surface, thus resulting in reduction of the porosity (i.e. reduction of surface area). In the catalyst carrier of the present invention, such a trend as described above tends to be particularly increased with the increase of additives (i.e., with the increase of the catalyst supported amount).

As is seen from the foregoing description, one of the features of the present invention is that the catalyst carrier has a catalytic function at high temperatures over 300° C. It should be noted here that the present invention is characterized in that:

(1) Since the alumina cement is employed, with addition thereto of the additives depending on the necessity, the catalyst carrier of the present invention is low in cost and can be formed into desired shapes without passing through a sintering process and the like by utilizing the binding power of the alumina cement itself.

(2) The catalyst carrier itself has a purification capacity for carbon monoxide at high temperatures (300° to 500° C.) and further absorbing and removing capacity for acid gases such as sulfur dioxide, etc., by the lime component contained in the alumina cement.

(3) The catalyst carrier has a considerably large surface area as well as an ample surface hardness, and thus sufficiently serves the purpose as a carrier.

(4) Adhering efficiency (including adhering strength) of the catalyst to the catalyst carrier is sufficiently large. In other words, wetting phenomenon between water, alcohol, etc., and the solvent of catalyst salts is large enough to support the catalyst effectively in a uniformly dispersed state.

(5) As compared with the commercially available alumina carrier, the carrier of the present invention has large abrasion strength, with small attrition loss during use, thus being stable as carrier for a long period of time.

(6) Since re-activation of the catalyst is possible by the catalyst carrier, catalyst of high performance with a long life can be obtained, with an extremely small amount of supported catalyst.

For example, when the platinum metallic catalyst is inactivated by sulfur dioxide gas as in The catalyst is regenerated by $CaO \cdot H_2O$ in the alumina cement as follows.

Meanwhile, in the case of metallic oxide $MO_x$, reactivation takes place as follows.

(7) The advantages of employing the alumina cement as the catalyst carrier are that the surface area is large as compared with conventional sintered carriers, since the cement particles are fine due to the capacity of molding at normal temperatures without necessity of sintering the molded carrier, and that in the known sintered carriers, although it is difficult to maintain the molding accuracy of the molded item (i.e., carrier) uniform due to thermal contraction of approximately 10 to 30% with respect to an original mold, such thermal contraction can be reduced below 2% for better molding accuracy when the alumina cement (which is not sintered) is employed.

(8) In the conventional sintered carrier whose surface is sintered, the surface area is small, and therefore, expected performance cannot be obtained unless a large amount of the catalyst is supported on the carrier through adhesion. On the contrary, since the molded carrier of the present invention is unsintered, the carrier surface is formed through aggregation of very fine particles, with a large surface area, only a small amount of supported catalyst is sufficient for the purpose, and can be dispersed uniformly on the carrier to provide the catalyst of high performance.

(9) Although the conventional alumina carrier of neutral nature requires a large amount of catalyst to be supported thereon, the alumina cement carrier according to the present invention is of alkaline nature, and is considered to accelerate effective support of a catalyst of precious metal salts, and provides an active precious metal catalyst in a small amount, although the process thereof is not sufficiently clear.

The catalyst according to the present invention as described in the foregoing is mainly intended for the purification of exhaust gases generated from household burning appliances and cooking appliances, and should preferably be used at comparatively low temperatures particularly lower than 700° C., but it should be noted that the catalyst of the present invention is not limited in its applications to the end uses as described above, but may also be effective for the purification and oxidation of exhaust gases generated from various plants and the like. It should also be noted that the catalyst of the present invention is not only effective for purification of carbon monoxide, hydrocarbon, etc., but fully displays its function as catalyst for absorbing and eliminating sulfur dioxide and, for converting NO into $NO_2$ in nitrogen oxide removing apparatuses, or as catalyst for reaction (platinum catalyst) between NO and CO or NO and $NH_3$.

Hereinbelow, the present invention will be described with reference to Examples for its illustration without any intention of limiting the scope thereof.

EXAMPLE 1

Pellets having diameter of 5 mm. were prepared from 100 parts by weight of alumina cement having the composition shown in the item iv of Table 1 and 100 parts by weight of silica sand (No. 7), and after particle size adjustment thereof to average length of 3 mm (2 to 4 mm), were subjected to heat treatment for one hour at a temperature of 300° C. to obtain the catalyst carriers. In the next step, the catalyst carriers thus prepared were impregnated with water solution prepared by dissolving hexachloroplatinate at a rate of 1 g/l to ultimately have platinum supporting amounts of 0.001, 0.01, and 0.05 weight %, with subsequent drying of the catalyst carriers for one hour at a temperature of 80° C. and heat treatment for one hour at a temperature of 500° C. in an electric furnace. The amounts of supported catalyst of 0.001, 0.01, and 0.05 weight % respectively were designated as a, b, and c, and the catalyst prepared by causing platinum of 0.5 weight % to be supported on the commercially available α-alumina was designated as d, while the catalyst prepared by molding a mixture of 25 parts by weight of the alumina cement having the composition in the item iv of Table 1 and 75 parts by weight of γ-$MnO_2$ was designated as e.

Figure 6:
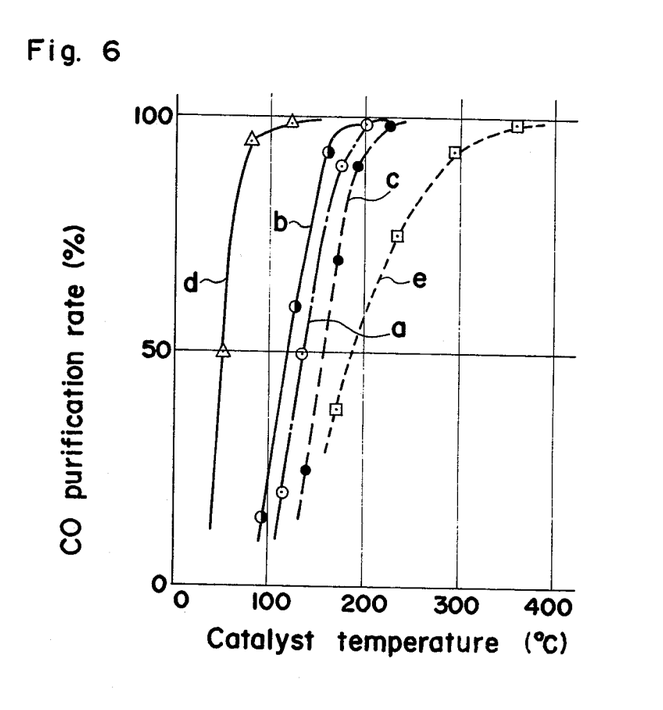
FIG. 6 is a graph showing a comparison of CO purification rates of catalysts according to the present invention and conventional catalysts.

The supported catalysts prepared in the above described manner were loaded in quartz tubes having inner diameter of 35 mm. by approximately 42 cc, respectively and air containing approximately 200 ppm. of carbon monoxide CO was caused to pass the catalyst layers at space velocity of 10,000 $hr^{-1}$ to obtain the CO purification rate through measurements of CO concentration at the inlet and outlet sides of the quartz tubes, the results of which are shown in the graph of FIG. 6. Although the catalysts a to c of the present invention were slightly inferior to the commercially available platinum catalyst d, their activity at low temperatures was seen to be improved as compared with the catalyst e of the manganese oxide group.

EXAMPLE 2

Figure 7:
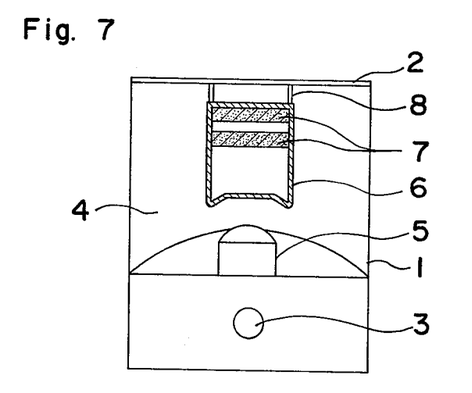
FIG. 7 is a schematic diagram of a petroleum heater employed for life test of catalysts according to EXAMPLE 2 of the present invention.
Figure 8:
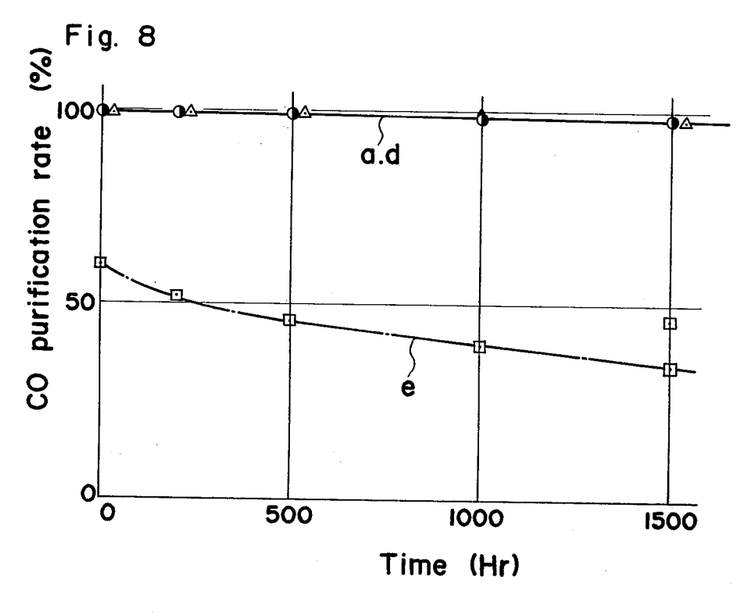
FIG. 8 is a graph showing results of life tests of catalysts according to EXAMPLE 2 of the present invention.

The catalysts obtained with reference to Example 1 were subjected to a life test through continuous burning of an oil heater as shown in FIG. 7, the results of which are shown in a graph of FIG. 8.

In FIG. 7, the oil heater employed for the life test generally includes a housing 1, a top plate 2 mounted on the top of the housing 1, a knob 3 for raising or lowering a burning wick provided on a front panel of the oil heater, a reflecting plate 4 and a chimney 5 provided at the front of the reflecting plate 4.

The oil heater of FIG. 7 further includes a catalyst tank 6 which is mounted immediately above the burning wick and which is provided with two stages of wire nettings of 10 meshes, while the catalyst pellets of 250 g are loaded on each of the stages to be 500 g in total for forming upper and lower catalyst layers 7. The catalyst tank 6 of a cylindrical shape having an internal diameter of 160 mm. is fixed for being suspended to metal fittings 8 secured to the top plate 2. During burning, the lower catalyst layer 7 was maintained at a temperature range of 600°±20° C., with space velocity of exhaust gases which pass through the catalyst layers 7 being about 20,000 $Hr^{-1}$/l layer.

For finding the CO purification rate, the catalyst in the lower catalyst layer 7 was taken out for subsequent drying for one hour at a temperature of 350° C., and after being kept for one day in a desiccator, was subjected to a similar procedure to that in Example 1.

EXAMPLE 3

Disc-shaped catalyst carriers each composed of 50 parts by weight of alumina cement having composition as shown in the item iv of Table 1 and 50 parts by weight of silica sand (No. 7) and having diameter of 200 mm. and thickness of 15 mm, with 1,200 holes (each 4 mm. in diameter) being formed in the direction of thickness, were prepared and subjected to heat treatments for one hour at a temperature of 300° C. Water solutions of chlorides of various platinum metals were applied to upper and lower surfaces of each of the catalyst carriers (apparent surface area of approximately 2,600 $cm^2$ (about 800 g)) for subsequent heat treatment for one hour at a temperature of 500° C. CO purification rates of the catalysts thus obtained are shown in Table 2 below.

Table 2

| Catalyst metals | | CO purification rate (%) | |
|---|---|---|---|
| Composition (weight ratio) | Supported Supported amount (weight %) | 100° C. | 200° C. |
| Pt-Pd (1:1) | 0.015 | 49 | 99 |
| Pt-Ru (1:1) | 0.015 | 43 | 97 |
| Pt-Pd (2:1) | 0.02 | 55 | 99 |
| Pd-Ru (2:1) | 0.02 | 39 | 96 |
| Rh-Ru (1:1) | 0.015 | 30 | 93 |
| Pd | 0.015 | 37 | 96 |
| Re | 0.015 | 25 | 89 |

EXAMPLE 4

After sufficiently mixing 25 parts by weight of alumina cement having composition shown in the item ii of Table 1, 25 parts by weight of silica sand (No. 5) and 50 parts by weight of γ-alumina powder, a solution prepared by mixing 3 parts by weight of water and 1 part by weight of ethyl alcohol was added to form the resultant mixture into a slurry which was then injected into a mold of silicone rubber, and after hardening, was released from the mold for subsequent perfect curing in warm water. After drying, the carrier thus obtained was subjected to heat treatment for one hour at a temperature of 300° C.

The resultant carrier obtained in the above described manner having the same configuration as that described with reference to Example 3 was caused to support various kinds of catalysts and placed in an exhaust gas passage of a petroleum fulled hot air blower (not shown) for measuring the purification rate for CO in the exhaust gases. In the above measurements, the catalyst was placed in two stages, and the exhaust gases contained 50 to 100 ppm of CO and 2 to 5 ppm of $SO_2$, while the temperature at a central portion of the catalyst at the lower stage was 600±20° C.

Figure 9:
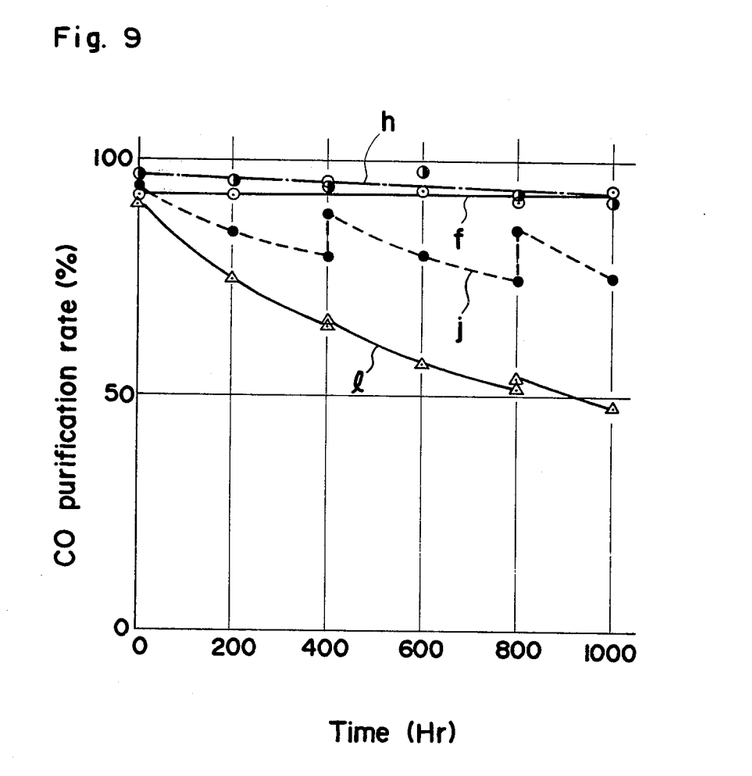
FIG. 9 is a graph showing a comparison of life tests of the catalysts of the present invention and conventional catalysts by the use of a petroleum fueled warm air blower.

The results of the above measurements are given in Table 3 below, while results of a longevity test on parts of the samples are shown in FIG. 9.

In Table 3, the sample 1 had α-alumina as the carrier, while in the sample h, platinum was caused to be supported after copper oxide having been supported. In other composite catalysts, mixed solutions of catalyst chlorides were used for simultaneous supporting.

Table 3

| | Catalyst composition (weight ratio) | Supported amount (weight %) | CO Concentration (ppm) in exhaust gas | | CO purification ratio (%) |
|---|---|---|---|---|---|
| | | | inlet side | Outlet side | |
| f | Pt | 0.01 | 70 | 5 | 93 |
| g | Pt-Pd (1:1) | 0.02 | 100 | 3 | 97 |

EXAMPLE 5

Disc-shaped catalyst carriers each composed of 35 parts by weight of alumina cement (the item iv of Table 1), 50 parts by weight of electrolytic manganese dioxide, 50 parts by weight of basic copper carbonate and 10 parts by weight of silica sand (No. 7), and having diameter of 200 mm and thickness of 15 mm, with 1,200 holes (each 4 mm in diameter) being formed in the direction of thickness, were prepared, and after being contacted with ethanol solutions of chlorides of various precious metals, was subjected to heat treatments for one hour at a temperature of 500° C.

The CO purification rates of the catalyst thus obtained at respective temperatures are tabulated in Table 4 below.

Table 4

| | Catalyst metals | | | |
|---|---|---|---|---|
| | Composition (weight ratio) | Supported amount (weight %) | CO purification rate | |
| | | | 100° C. | 200° C. |
| Pt Pd | 1:1 | 0.04 | 40 | 97 |
| Pt Ru | 1:1 | 0.04 | 37 | 95 |
| Pt Rh | 1:1 | 0.04 | 35 | 95 |
| Pt Pd | 2:1 | 0.07 | 45 | 98 |
| Pd Ru | 2:1 | 0.07 | 33 | 94 |
| Rh Ru | 1:1 | 0.07 | 27 | 90 |
| Pd | — | 0.04 | 30 | 93 |

Table 4-continued

| | Catalyst metals | | | |
|---|---|---|---|---|
| | Composition (weight ratio) | Supported amount (weight %) | CO purification rate | |
| | | | 100° C. | 200° C. |
| Re | — | 0.04 | 22 | 85 |
| Ru | — | 0.04 | 21 | 83 |

As is clear from the foregoing description, according to the present invention, improved gas purification catalysts of high performance and low cost, and manufacturing method thereof can be advantageously presented, with substantial elimination of disadvantages inherent in the conventional gas purification catalysts.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A catalyst for use in purification of a gas which comprises a catalyst carrier composed of alumina cement having a CaO component of less than 40% by weight, an $Al_2O_3$ component of more than 35% by weight and a $Fe_2O_3$ component of less than 20% by weight and at least one aggregate selected from the group consisting of silica aggregate, silica-alumina aggregate, and alumina aggregate, and a platinum group metal supported on said catalyst carrier in an amount of 0.001 to 0.1% by weight, said catalyst being produced by the steps comprising:
   a. molding a molded body from a mixture comprising alumina cement and said aggregate;
   b. curing said molded body for the hardening thereof,
   c. subsequently heat treating said hardened molded body at a temperature range from 250° to 700° C. to obtain a catalyst carrier; and
   d. causing a platinum group metal to be supported on said catalyst carrier by steps comprising:
      1. contacting said carrier with a solution of a salt of said platinum group metal to impregnate said solution on the surface of said carrier; and
      2. subsequently heat treating said catalyst impregnated carrier at a temperature below 700° C. to convert said platinum group metallic salt into a platinum group metal.

2. A catalyst as claimed in claim 1, wherein said catalyst carrier further includes at least one oxide of manganese and copper.

3. A catalyst as claimed in claim 1 wherein said catalyst carrier includes at least one member selected from the group consisting of ferrites and zeolites.

4. A catalyst as claimed in claim 1, wherein said catalyst carrier further includes an auxiliary agent composed of at least one of asbestos and glass fiber.

5. A method of manufacturing a supported catalyst as claimed in claim 1, further employing a solvent medium for said solution of platinum group metallic salt, which medium is at least one member selected from the group of water and alcohol.

* * * * *